(No Model.)

J. CLELAND.
FASTENING DEVICE FOR CUFFS, &c.

No. 575,802. Patented Jan. 26, 1897.

WITNESSES
C. Nordford
L. M. Muller

INVENTOR
James Cleland,
BY
Edgar Tate & Co.
ATTORNEYS

UNITED STATES PATENT OFFICE.

JAMES CLELAND, OF BALLINAHINCH, IRELAND.

FASTENING DEVICE FOR CUFFS, &c.

SPECIFICATION forming part of Letters Patent No. 575,802, dated January 26, 1897.

Application filed August 7, 1896. Serial No. 601,973. (No model.)

*To all whom it may concern:*

Be it known that I, JAMES CLELAND, a citizen of the United Kingdom of Great Britain and Ireland, and a resident of Drumaness Ballinahinch, in the county of Down, Ireland, have invented certain new and useful Improvements in Fastening Devices for Cuffs and Similar Articles, of which the following is a specification, reference being had to the accompanying drawings, forming a part thereof, in which similar numerals of reference indicate corresponding parts wherever found throughout the several views.

This invention relates to fastening devices for cuffs and similar articles, and the object thereof is to provide an improved device of this class by means of which the cuff may be connected with the lining of a coat-sleeve or other garment.

The invention is fully disclosed in the following specification, of which the accompanying drawings form a part, in which—

Figure 1:
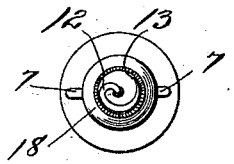
Figure 2:
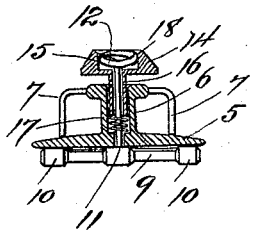

Figure 1 is a plan view of my improved fastening device; Fig. 2, a central transverse section thereof, and Fig. 3 a bottom plan view thereof.

In the accompanying drawings I have shown my improved fastening device on an enlarged scale, and in the practice of my invention I provide a disk or plate 5, on one side of which is formed a tubular shank 6, to the outer end of which are preferably secured angular side arms or braces 7, which extend outwardly from the opposite sides of the outer end of the tubular shank 6 and are then curved inwardly at right angles and connect with the adjoining side or surface of the disk or plate 5.

Figure 3:
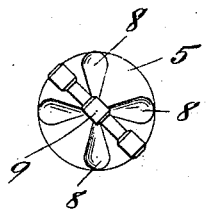

The outer side or surface of the disk or plate 5 is provided with radial grooves 8, which are preferably of the form shown in Fig. 3, and I also provide a cross-head 9, having at each end a knob or ball 10, and said cross-head is provided centrally thereof with a shaft 11, which passes through the tubular shank 6 and which is provided at its outer end with a spiral screw 12, which is provided with a point, as shown at 13. I also provide a movable button or head 14, which is preferably slightly conical in form and the apex of which is cut away and provided with a circular chamber 15, and said head or button 14 is provided with a tubular shank 16, which projects into the tubular shank 6 of the disk 5, and mounted in said tubular shank 6 and bearing upon the disk 5 and upon the end of the shank 16 of the head or button 14 is a spiral spring 17.

It will be observed that the spiral screw 12 holds the button or head 14 in place, and the normal position of these parts when the device is not in use is that shown in Fig. 2, in which position the spring 17 forces the button or head 14 outwardly and holds the knobs or heads 10 of the cross head or bar 9 in the grooves 8 in the outer side of the disk or plate 5.

The outer annular edge 18 of the button or head 14 is preferably milled, as shown in Fig. 1, and also preferably beveled inwardly, as shown in Fig. 2, and the operation will be readily understood from the foregoing description when taken in connection with the accompanying drawings and the following statement thereof. Whenever it is desired to connect a cuff with the sleeve of a coat or other garment, the button or head 14 and the side arms or braces 7 are passed through the buttonhole in the cuff and the head or button 14 is pressed against the article or garment to which the cuff is to be attached. This operation forces the head or button 14 inwardly against the operation of the spring 17 and exposes the spiral 12, and then by turning the cross head or bar 9 said spiral will be forced into the sleeve or garment, after which by removing the pressure and releasing the cross-bar the spring 17 will force the head or button 14 outwardly and draw the sleeve or the lining thereof or the other article or garment closely into said button or head 9, and the ends or knobs 10 of the cross bar or head 9 will be held in the grooves 8, and whenever it is desired to disconnect the cuff from the article to which it is attached it is only necessary to reverse this operation.

This device is simple in construction and operation and perfectly adapted to accomplish the result for which it is intended, and it is evident that changes in and modifications of the construction herein described may be made without departing from the spirit of my invention or sacrificing its advantages.

Having fully described my invention, I claim as new and desire to secure by Letters Patent—

1. A fastening device for cuffs and other articles, consisting of a disk or plate having a tubular shank on one side thereof, a cross-head provided with a shaft, which passes through said disk or plate, and through said tubular shank, a button or head provided with a tubular shank which is adapted to enter the tubular shank on the disk or plate, a spring mounted between the inner end of the tubular shank on the button or head, and the disk or plate, and a spiral coil or screw formed on the outer end of the shank which is connected with the cross-head, and which enters a chamber formed in said button or head, substantially as shown and described.

2. A fastening device for cuffs and other articles, consisting of a disk or plate having a tubular shank on one side thereof, a cross-head provided with a shaft, which passes through said disk or plate, and through said tubular shank, a button or head provided with a tubular shank which is adapted to enter the tubular shank on the disk or plate, a spring mounted between the inner end of the tubular shank on the button or head, and the disk or plate, and a spiral coil or screw formed on the outer end of the shank which is connected with the cross-head, and which enters a chamber formed in said button or head, said disk or plate being also provided on its outer side or surface with radial grooves or recesses, and said cross-head being provided at its ends with knobs which are adapted to rest therein, substantially as shown and described.

3. A fastening device for cuffs and other articles, consisting of a disk or plate having a tubular shank on one side thereof, a cross-head provided with a shaft, which passes through said disk or plate, and through said tubular shank, a button or head provided with a tubular shank which is adapted to enter the tubular shank on the disk or plate, a spring mounted between the inner end of the tubular shank on the button or head, and the disk or plate, and a spiral coil or screw formed on the outer end of the shank which is connected with the cross-head, and which enters a chamber formed in said button or head, said disk or plate being also provided on its outer side or surface with radial grooves or recesses, and said cross-head being provided at its ends with knobs which are adapted to rest therein, and the tubular shank on said disk or plate, being provided with side arms or braces, which connect therewith, and with said disk or plate, substantially as shown and described.

In testimony that I claim the foregoing as my invention I have signed my name, in presence of the subscribing witnesses, this 25th day of July, 1896.

JAMES CLELAND.

Witnesses:
JOHN MARTIN,
THOMAS ADAMSON.